US012561648B2

(12) United States Patent
Loi et al.

(10) Patent No.: US 12,561,648 B2
(45) Date of Patent: *Feb. 24, 2026

(54) AUGMENTING AN AVAILABILITY OF AN ITEM AT A WAREHOUSE DETERMINED FROM AN AVAILABILITY MODEL WITH INFORMATION FROM SHOPPERS FULFILLING ORDERS ON ITEM AVAILABILITY

(71) Applicant: Maplebear Inc., San Francisco, CA (US)

(72) Inventors: Joey Loi, San Francisco, CA (US); Viswa Mani Kiran Peddinti, San Francisco, CA (US); Eugene Agronin, Sunnyvale, CA (US); John Salaveria, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 888 days.

This patent is subject to a terminal disclaimer.

(21) Appl. No.: 17/570,038

(22) Filed: Jan. 6, 2022

(65) Prior Publication Data

US 2023/0214774 A1     Jul. 6, 2023

(51) Int. Cl.
| | |
|---|---|
| *G06Q 10/0875* | (2023.01) |
| *G06N 20/00* | (2019.01) |
| *G06Q 30/0601* | (2023.01) |

(52) U.S. Cl.
CPC ......... *G06Q 10/0875* (2013.01); *G06N 20/00* (2019.01); *G06Q 30/0635* (2013.01)

(58) Field of Classification Search
CPC ............. G06Q 10/0875; G06Q 10/087; G06Q 30/0635; G06Q 30/0633; G06N 20/00; G06N 7/01

(Continued)

(56) References Cited

U.S. PATENT DOCUMENTS

| | | | |
|---|---|---|---|
| 10,242,336 B1 * | 3/2019 | Agarwal | .............. G06Q 10/083 |
| 2016/0042315 A1 * | 2/2016 | Field-Darragh | ......... H04B 5/77 705/28 |

OTHER PUBLICATIONS

Unknown. Manhattan Associates Delivers First Omni-Channel-as-a-Service Platform: Innovation sets standard for next-generation retail sales, service, and fulfillment. NASDAQ OMX's News Release Distribution Channel; New York. May 9, 2017. (Year: 2017).*

(Continued)

*Primary Examiner* — Fawaad Haider
(74) *Attorney, Agent, or Firm* — Fenwick & West LLP

(57) ABSTRACT

An online concierge system displays an ordering interface to users that displays items offered by various warehouses. The online concierge system includes machine learning availability model that estimates an item's availability and visually distinguishes items offered by a warehouse having less than a threshold availability from other items. Because information from a warehouse that an item that was out of stock is now in stock is often delayed, the online concierge system transmits a request to a shopper fulfilling an order to check for an item's availability at a warehouse. For example, the online concierge system allows users to include a request for an indication of an item's availability when placing an order. When the online concierge system receives a threshold number of requests for the item, the online concierge system prompts a shopper fulfilling an order including items near the item for the item's availability.

19 Claims, 6 Drawing Sheets

(58) Field of Classification Search
USPC ........................................................... 705/29
See application file for complete search history.

(56) References Cited

OTHER PUBLICATIONS

Sharma, Ajit et al. Drive Through Robotics: Robotic Automation for Last Mile Distribution of Food and Essentials During Pandemics. IEEE Access, 2020. (Year: 2020).*

* cited by examiner

100

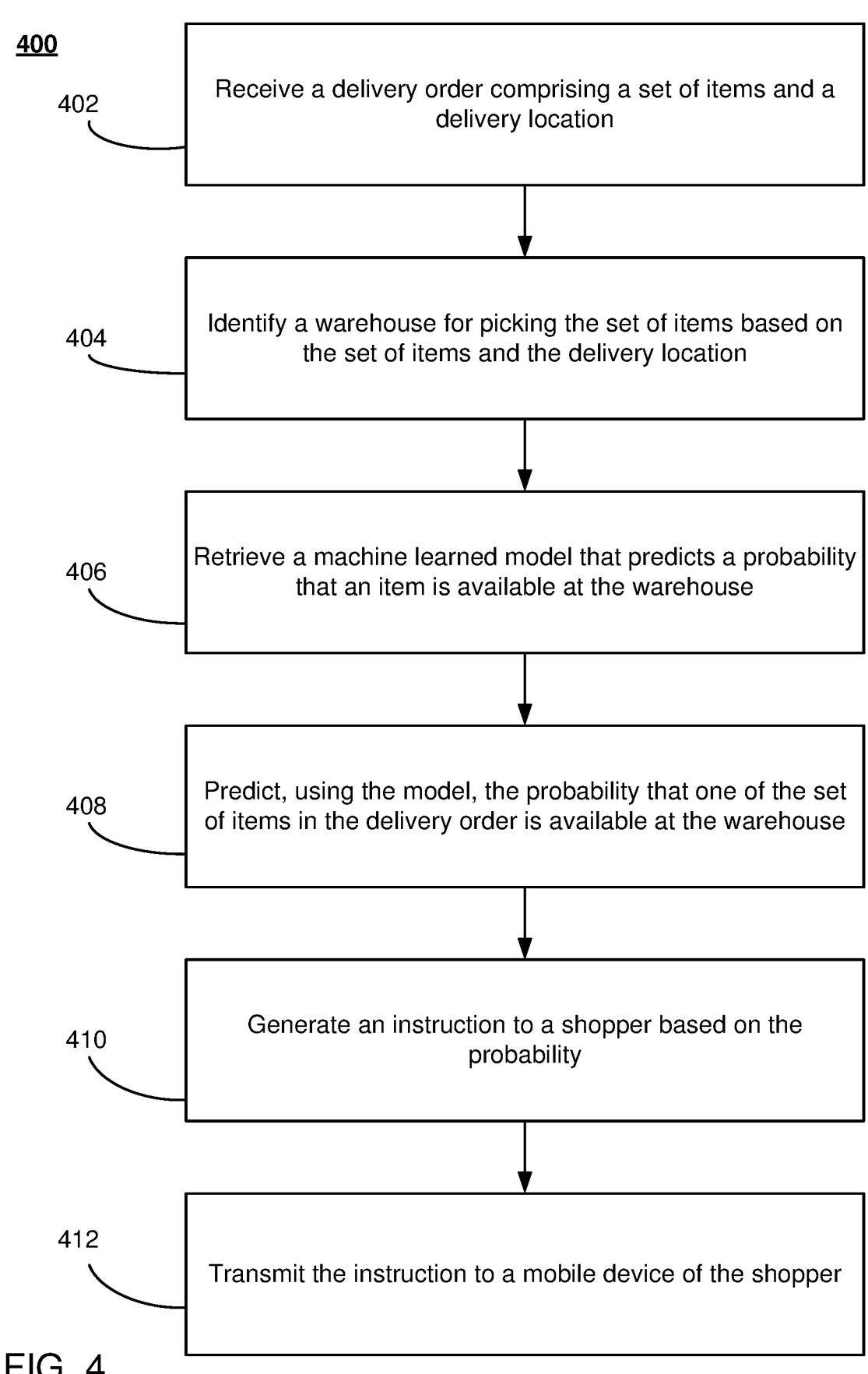

400

402 — Receive a delivery order comprising a set of items and a delivery location 404 — Identify a warehouse for picking the set of items based on the set of items and the delivery location 406 — Retrieve a machine learned model that predicts a probability that an item is available at the warehouse 408 — Predict, using the model, the probability that one of the set of items in the delivery order is available at the warehouse 410 — Generate an instruction to a shopper based on the probability 412 — Transmit the instruction to a mobile device of the shopper

FIG. 4

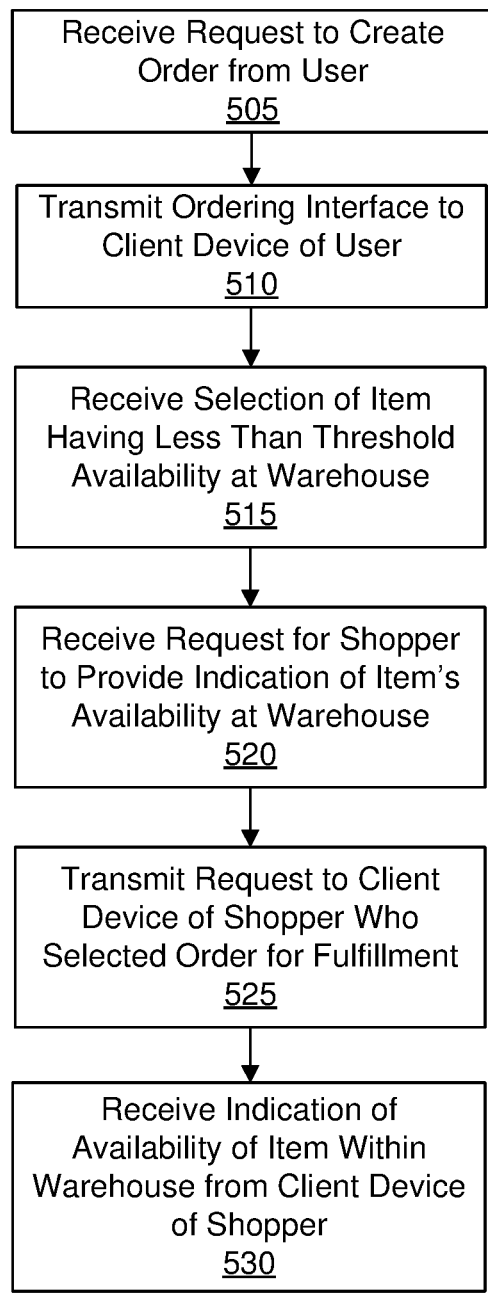

Receive Request to Create
Order from User
505

Transmit Ordering Interface to
Client Device of User
510

Receive Selection of Item
Having Less Than Threshold
Availability at Warehouse
515

Receive Request for Shopper
to Provide Indication of Item's
Availability at Warehouse
520

Transmit Request to Client
Device of Shopper Who
Selected Order for Fulfillment
525

Receive Indication of
Availability of Item Within
Warehouse from Client Device
of Shopper
530

FIG. 5

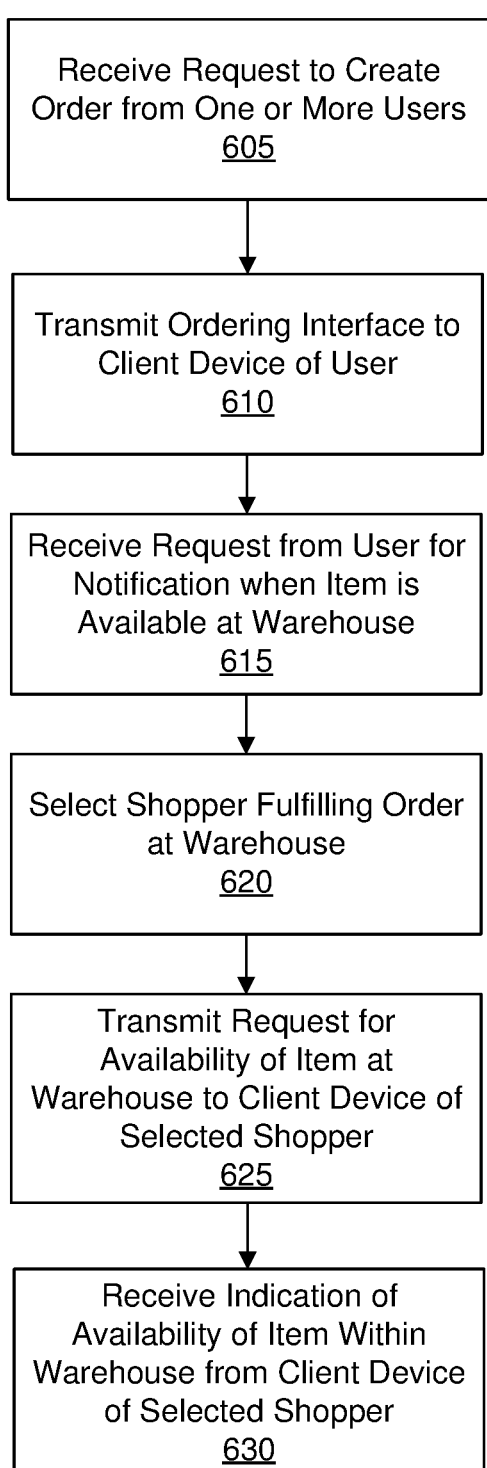

Receive Request to Create
Order from One or More Users
605

Transmit Ordering Interface to
Client Device of User
610

Receive Request from User for
Notification when Item is
Available at Warehouse
615

Select Shopper Fulfilling Order
at Warehouse
620

Transmit Request for
Availability of Item at
Warehouse to Client Device of
Selected Shopper
625

Receive Indication of
Availability of Item Within
Warehouse from Client Device
of Selected Shopper
630

FIG. 6

AUGMENTING AN AVAILABILITY OF AN ITEM AT A WAREHOUSE DETERMINED FROM AN AVAILABILITY MODEL WITH INFORMATION FROM SHOPPERS FULFILLING ORDERS ON ITEM AVAILABILITY

BACKGROUND

This disclosure relates generally to determining availability of items at a warehouse for inclusion in orders received by an online concierge system, and more specifically to initiating a shopper to check for availability of an item when fulfilling one or more orders at the warehouse.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To aid users in creating an order, an online concierge system determines availability of various items at a warehouse when a user is creating an order for fulfillment at the warehouse. Online concierge systems may use information from the warehouse about an inventory of items available at the warehouse to determine item availability. Other online concierge systems may use techniques to predict an availability of various items based on information received from a warehouse and information about an order.

When a user is placing an order for a warehouse through an online concierge system, many online concierge systems hide items having less than a threshold availability at the warehouse. While this reduces a number of items for a user to review when placing the order, an online concierge system may infrequently receive information from a warehouse about current inventory of items or a technique used by an online concierge system incorrectly predicts availability of items. Hiding an item from a user based on outdated or incorrect information prevents users from including certain items that are available from the warehouse in an order. Such an inability to include items that are available in an order from the warehouse decreases subsequent interaction with the online concierge system by users

SUMMARY

An online concierge system receives a request to create an order from a user. The request identifies a warehouse from which items included in the order are obtained. In various embodiments, in response to receiving the request, the online concierge system transmits an ordering interface to a client device of the user for display in a customer mobile application executing on the client device. The ordering interface displays items offered by the warehouse identified by the request and receives selections of items for inclusion in the order from the user.

When generating the ordering interface transmitted to the client device, the online concierge system determines availabilities of items offered by the warehouse. The online concierge system maintains a machine-learned item availability model that is applied to a combination of the warehouse identified by the request to create the order and an item offered by the warehouse to output a probability of the item being available at the warehouse (also referred to as an "availability" of the item). The online concierge system accounts for availabilities of items when displaying items via the ordering interface. For example, the ordering interface visually distinguishes items having less than a threshold availability from items having greater than the threshold availability. As an example, the ordering interface displays text, a symbol, or an image in conjunction with information identifying an item having less than the threshold availability. In other examples, the ordering interface displays information identifying an item having less than the threshold availability using a different color or a different font than items having at least the threshold availability. In some embodiments, the ordering interface displays an estimated time when the item is expected to have at least the threshold availability at the warehouse. The estimated time may be determined by the machine-learned item availability model in some embodiments, while in other embodiments, a different trained model determines the estimated time when the item is likely to have at least the threshold availability at the warehouse from information obtained from the warehouse and from one or more shoppers fulfilling orders at the warehouse.

In response to receiving a selection of an item having less than the threshold availability, the online concierge system prompts the user to identify one or more replacement items in some embodiments. A replacement item identifies an item for a shopper to obtain if the selected item is not available at the warehouse. However, the machine-learned item availability model may infrequently receive information from the warehouse about current inventory of items or may incorrectly predict the availability of the item. To account for potential inaccuracy of the availability of the item predicted at the warehouse by the machine-learned item availability model, in response to receiving the selection of the item having less than the threshold availability, the online concierge system transmits a prompt to the client device of the user that allows the user to request that a shopper provide the online concierge system with an indication of the item's availability at the warehouse when the shopper is fulfilling the order at the warehouse. For example, the ordering interface displays a selectable element in conjunction with information identifying the item and with a prompt to request a current inventory of the item.

In response to receiving a request from the user for a shopper to provide an indication of the availability of the item having less than the threshold availability at the warehouse, the online concierge system stores the request in association with the item having less than the threshold availability and in association with the order. When a shopper subsequently selects the order for fulfillment, the online concierge system transmits the request for the shopper to provide the indication of the availability of the item to a client device of the shopper along with the items included in the order, providing the shopper with an instruction or other cue to determine an availability within the warehouse of the item having less than the threshold availability.

When the shopper fulfills the order, the online concierge system receives an indication of the availability within the warehouse of the item having less than the threshold availability from the client device of the shopper. In various embodiments, the indication has a first value when the shopper locates the item within the warehouse and has a second value when the shopper does not locate the item within the warehouse. In response to receiving an indication from the shopper that the item having less than the threshold availability was available in the warehouse, the online concierge system updates stored information about the item at the warehouse to indicate that the item having less than the threshold availability is available at the warehouse. Alternatively, the embodiment is an image of a location within the warehouse of the item, and the online concierge system processes the image to determine whether the item is included in the image; the online concierge system stores the first value in association with the item and the warehouse in response to determining the image includes the item and stores the second value in association with item in response to determining the image does not include the item. In some embodiments, updating the stored information about the item at the warehouse from the received indication from the shopper causes the online concierge system to update the machine-learned item availability model to account for the indication that the item having less than the threshold availability was available at the warehouse when the shopper fulfilled the order. The online concierge system may update the machine-learned item availability model in response to receiving the indication that the item having less than the threshold availability is available at the warehouse, allowing the online concierge system to update the machine-learned item availability model to more accurately predict availability of the item at the warehouse 110 for subsequent orders. Additionally, the online concierge system may update the machine-learned item availability model in response to the indication received from the shopper indicating that the item having less than the threshold availability is not available at the warehouse, allowing the online concierge system to further refine the machine-learned item availability model when the item having less than the threshold availability at the warehouse is determined by the shopper not to be available at the warehouse.

Alternatively or additionally, the online concierge system includes a selectable option in the ordering interface proximate to an item having less than the threshold availability. The selectable option allows a user to request a notification from the online concierge system when the online concierge system determines the item has greater than the threshold availability at the warehouse or determines the item has at least an additional availability at the warehouse. For example, the ordering interface displays a prompt with text of "Notify Me When Available" proximate to the selectable option and to the item having less than the threshold availability.

When a user selects the selectable option displayed proximate to an item having less than the threshold availability, the online concierge system receives a request from the user for a notification when the item having less than the threshold availability from a client device of the user. The request includes an identifier of the user and an identifier of the item having less than the threshold availability. The online concierge system stores the request in association with the user, in association with the item having less than the threshold availability, and in association with a warehouse identified by the user for an order. The online concierge system stores a time when the request was received in various embodiments.

In various embodiments, the online concierge system determines a number of requests to be notified about availability received for a combination of a warehouse and an item during a specific time interval. In response to the determined number of requests to be notified about availability received for the combination of a warehouse and the item during the specific time interval equaling or exceeding a threshold value, the online concierge system selects a shopper fulfilling one or more orders and transmits a request for the selected shopper to provide an indication of the availability of the item to a client device of the shopper, providing the shopper with an instruction or other cue to determine an availability within the warehouse of the item. In other embodiments, the online concierge system selects a shopper fulfilling one or more orders and transmits the request for the selected shopper to provide the indication of the availability of the item to the client device of the shopper in response to determining that an amount of time between a current time and a time when the online concierge system received an indication of availability within the warehouse of the item equals or exceeds a threshold amount of time. Alternatively, the online concierge system selects a shopper fulfilling one or more orders and transmits the request for the selected shopper to provide the indication of the availability of the item to the client device of the shopper in response to determining that an amount of time between a current time and a time when the online concierge system received inventory information from the warehouse or from received one or more shoppers about availability for a combination of a warehouse and an item equals or exceeds a threshold amount of time.

In various embodiments, the online concierge system accounts for locations of shoppers when selecting a shopper, allowing the online concierge system to minimize additional distance traveled by the shopper to determine whether the item is available within the warehouse. For example, in response to the determined number of requests to be notified about availability received for the combination of the warehouse and the item during the specific time interval equaling or exceeding a threshold value, the online concierge system identifies shoppers who are currently fulfilling orders in the warehouse based on information from client devices of the shoppers (e.g., orders previously selected by shoppers and information received from shoppers who previously selected orders indicating when a shopper obtained an item included in a previously selected order). The online concierge system identifies orders selected for fulfillment in the warehouse by each of the identified shoppers. In some embodiments, the online concierge system accounts for characteristics of orders selected for fulfillment by shoppers when identifying shoppers. The online concierge system selects a shopper who has selected an order that includes one or more items within a threshold distance within the warehouse of the item. In other embodiments, the online concierge system selects a shopper based on locations of shoppers obtained from client devices of shoppers. For example, the online concierge system selects a shopper who selected an order for fulfillment at the warehouse, has not fulfilled the order, and is within a threshold distance of the warehouse for fulfilling the order. The online concierge system receives a location of a shopper from one or more position sensors (e.g., global positioning sensors) included in a client device of the shopper in various embodiments. Alternatively, the online concierge system determines a location of a shopper within a warehouse from information about order fulfillment received from the shopper. For example, the online concierge system determines the shopper is obtaining an additional item included in an order and determines a location within the warehouse of the additional item being obtained by the shopper; the online concierge system selects the shopper in response to determining the location within the warehouse of the additional item being obtained by the shopper is within a threshold distance of a location within the warehouse of the item.

As the selected shopper fulfills the order at the warehouse, the online concierge system receives an indication of the availability within the warehouse of the item from the client device of the shopper. In various embodiments, the indication has a first value when the shopper locates the item within the warehouse and has a second value when the shopper does not locate the item within the warehouse. Alternatively, the embodiment is an image of a location within the warehouse of a location of the item, and the online concierge system processes the image to determine whether the item is included in the image; the online concierge system stores the first value in association with the item and the warehouse in response to determining the image includes the item and stores the second value in association with item in response to determining the image does not include the item. In response to receiving an indication from the shopper that the item having less than the threshold availability was available in the warehouse, the online concierge system updates stored information about the item at the warehouse to indicate that the item having less than the threshold availability is available at the warehouse. In some embodiments, updating the stored information about the item at the warehouse from the received indication from the shopper causes the online concierge system to update the machine-learned item availability model to account for the indication that the item having less than the threshold availability was available at the warehouse when the shopper fulfilled the order.

BRIEF DESCRIPTION OF THE DRAWINGS

FIG. 4 is a flowchart illustrating a process for predicting inventory availability, according to one embodiment.

FIG. 5 is a flowchart of a method for requesting an indication of an item's availability from a shopper fulfilling one or more orders at a warehouse, according to one embodiment.

FIG. 6 is a flowchart of a method for an online concierge system requesting an indication of an item's availability from a shopper fulfilling one or more orders at a warehouse, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
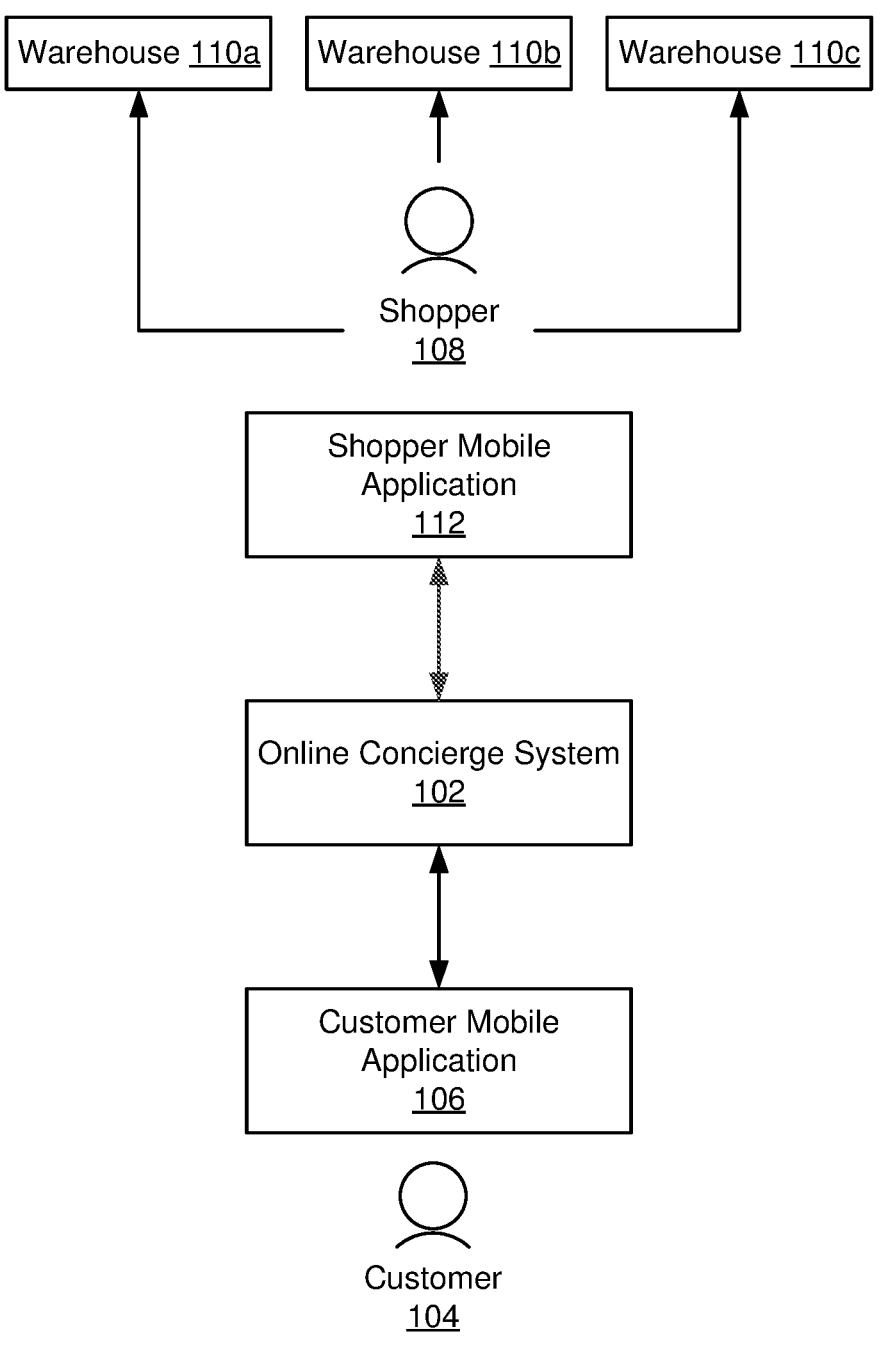
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104, also referred to herein as "users," (only one is shown for the sake of simplicity). An order specifies a list of goods (items or products) to be delivered to the customer 104 (or "user"). The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
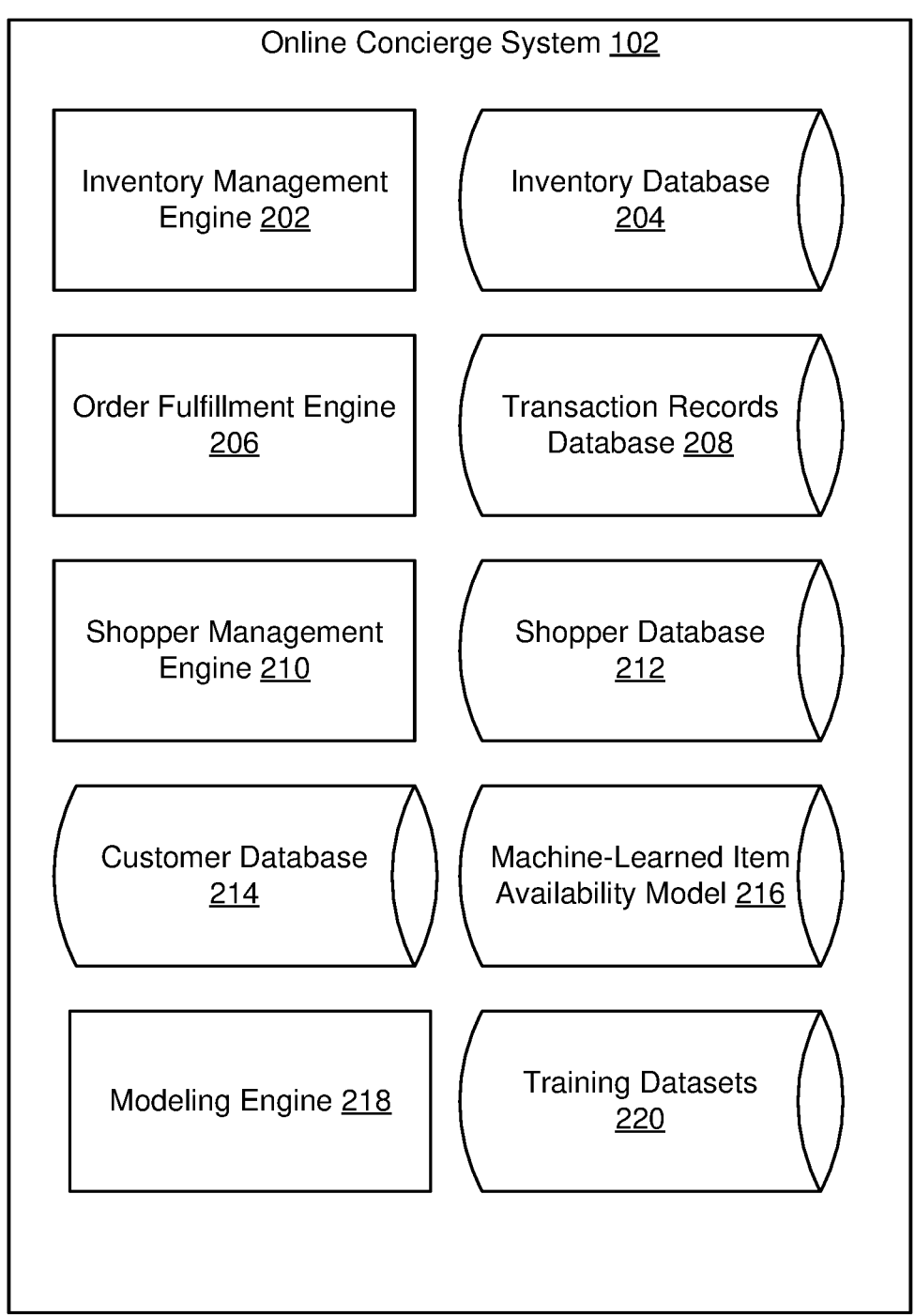
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

The inventory management engine 202 receives an item catalog from a warehouse 110 identifying items offered for purchase by the warehouse 110. The item catalog identifies different items offered by the warehouse 110 and includes attributes of each item. One attribute of an item is a location of the item within the warehouse 110. For example, the item catalog includes an aisle within the warehouse 110 or a department within the warehouse 110 for an item. Various other attributes may be included for an item in the item catalog, allowing the warehouse 110 to provide any suitable information about items offered by the warehouse to the online concierge system 102 via the item catalog. The item catalog for a warehouse 110 is stored in the inventory database 204 in association with an identifier of the warehouse 110.

In various embodiments, the inventory management engine 202 maintains a taxonomy of items offered for purchase by one or more warehouses 110. From the item catalog, the inventory management engine 202 determines a taxonomy of items offered by the warehouse 110. Different levels in the taxonomy providing different levels of specificity about items included in the levels. For example, the taxonomy includes different categories for items, with categories in different levels of the taxonomy providing different levels of specificity for categories, with lower levels in the hierarchy corresponding to more specific categories, and a lowest level of the hierarchy identifying different specific items. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy.

In various embodiments, the inventory management engine 202 also receives a layout from the warehouse 110, with the layout identifying different locations within the warehouse 110 relative to each other. For example, the layout is a map of the warehouse 110, with different aisles or departments identified in the map, allowing the map to identify relative positions of aisles or departments to each other within the warehouse 110. The inventory management engine 202 receives an updated layout from the warehouse 110 if the warehouse 110 changes locations of items within the warehouse 110 or rearranges locations in the warehouse 110 relative to each other. In various embodiments, the layout for a warehouse 110 is stored in the inventory database 204 in association with an identifier of the warehouse 110.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 transmits an ordering interface to a client device of a user that is displayed to the user in a customer mobile application 106. The ordering interface receives a selection of a warehouse 110 from a user identifying a warehouse 110 for fulfilling an order. The ordering interface displays items offered by the warehouse 110 to the user, and receives selections of items for inclusion in an order from the user. For example, the ordering interface receives one or more search terms from the user and displays items offered by the warehouse 110 having attributes that at least partially match the received search terms. In various embodiments, the order fulfillment engine 206 accounts for availabilities or items offered by the warehouse 110 determined from a machine-learned item availability model 218, further described below in conjunction with FIGS. 2 and 4 when displaying items offered by the warehouse 110. As further described below in conjunction with FIG. 5, the ordering interface generated by the order fulfillment engine 206 identifies items offered by the warehouse 110 that have less than a threshold availability at a time when the user requested to create the order. For example, the ordering interface visually distinguishes items having less than the threshold availability at the warehouse 110 from other items. Additionally, the ordering interface includes a selectable element displayed in conjunction with the items having less than the threshold availability. In response to receiving a selection of the selectable element displayed in conjunction with an item having less than the threshold availability, the online concierge system 102 includes a request in the order for a shopper to transmit an indication of the availability of the item at the warehouse 110 when fulfilling the order.

As further described below in conjunction with FIG. 6, the order fulfillment engine 206 may alternatively or additionally include a request in an order for a shopper to transmit the indication of the availability of the item at the warehouse when fulfilling the order in response to information about the item in the inventory database 204. For example, the order fulfillment engine 206 includes a request in an order for a shopper to transmit an indication of the availability of the item in response to receiving at least a threshold number of requests to be notified of an item's availability at a warehouse 110 or in response to at least a threshold amount of time lapsing between a current time and a prior receipt of availability of the item. In various embodiments, the order fulfillment engine 206 also determines a shopper fulfilling an order to whom a request for the indication of availability of the item is transmitted, as further described in conjunction with FIG. 6.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

Machine Learning Model

The online concierge system 102 further includes a machine-learned item availability model 216, a modeling engine 218, training datasets 220, a recipe processor 222, and a recipe store 224. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110, also referred to as a predicted availability of the item at the warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times, and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
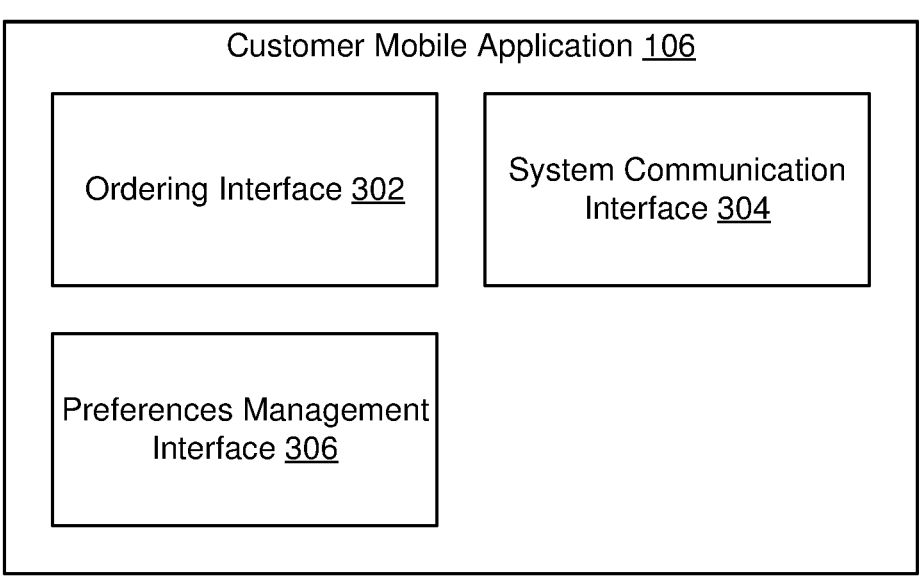
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 (or "user") can browse through and select items and place an order. In various embodiments, the ordering interface 302 includes an interface element, that when selected by a user, prompts the user to specify one or more attributes of an item included in the order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
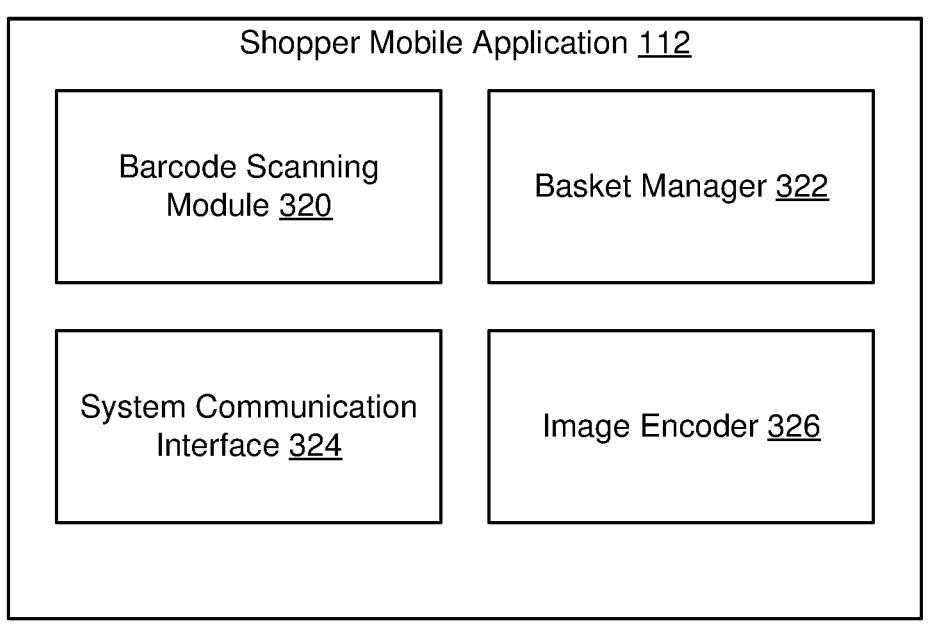
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. In some other examples, the order fulfillment engine 206 sends a message and/or instruction to a user based on the probability predicted by the machine-learned item availability model 216. As further described below in conjunction with FIGS. 5 and 6, the order fulfillment engine 206 may send a request for availability of an item at a warehouse based on the probability predicted by the machine-learned item availability model 216 for an item that is not included in an order being fulfilled by the shopper at the warehouse 110.

Requesting Indication of an Item's Availability from a Shopper Fulfilling One or More Orders FIG. 5 is a flowchart of one embodiment of a method for requesting an indication of an item's availability from a shopper fulfilling one or more orders at a warehouse 110. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 receives 505 a request to create an order from a user. The request identifies a warehouse 110 from which items included in the order are obtained. In various embodiments, in response to receiving 505 the request, the online concierge system 102 transmits 510 an ordering interface to a client device of the user for display in a customer mobile application 106 executing on the client device. The ordering interface displays items offered by the warehouse 110 identified by the request and receives selections of items for inclusion in the order from the user.

When generating the ordering interface transmitted to the client device, the online concierge system 102 determines availabilities of items offered by the warehouse. As further described above in conjunction with FIGS. 2 and 4, the online concierge system 102 maintains a machine-learned item availability model 216 that is applied to a combination of the warehouse 110 identified by the request to create the order and an item offered by the warehouse 110 to output a probability of the item being available at the warehouse 110 (also referred to as an "availability" of the item). The online concierge system 102 accounts for availabilities of items when displaying items via the ordering interface. For example, the ordering interface visually distinguishes items having less than a threshold availability from items having greater than the threshold availability. As an example, the ordering interface displays text, a symbol, or an image in conjunction with information identifying an item having less than the threshold availability. In other examples, the ordering interface displays information identifying an item having less than the threshold availability using a different color or a different font than items having at least the threshold availability or the ordering interface displays information identifying the item having less than the threshold availability in a lower position in the ordering interface than other items. In some embodiments, the ordering interface displays an estimated time when the item is expected to have at least the threshold availability at the warehouse 110. The estimated time may be determined by the machine-learned item availability model 216 in some embodiments, while in other embodiments, a different trained model determines the estimated time when the item is likely to have at least the threshold availability at the warehouse 110 from information obtained from the warehouse 110 and from one or more shoppers fulfilling orders at the warehouse 110.

In response to receiving 515 a selection of an item having less than the threshold availability, the online concierge system 102 prompts the user to identify one or more replacement items in some embodiments. A replacement item identifies an item for a shopper to obtain if the selected item is not available at the warehouse 110. However, the machine-learned item availability model 216 may infrequently receive information from the warehouse 110 about current inventory of items or may incorrectly predict the availability of the item. To account for potential inaccuracy of the availability of the item predicted at the warehouse 110 by the machine-learned item availability model 216, in response to receiving 515 the selection of the item having less than the threshold availability, the online concierge system 102 transmits a prompt to the client device 110 of the user that allows the user to request that a shopper provide the online concierge system 110 with an indication of the item's availability at the warehouse 110. For example, the ordering interface displays a selectable element in conjunction with information identifying the item and with a prompt to request a current inventory of the item.

In response to receiving 520 a request from the user for a shopper to provide an indication of the availability of the item having less than the threshold availability at the warehouse 110, the online concierge system 102 stores the request in association with the item having less than the threshold availability and in association with the order. When a shopper subsequently selects the order for fulfillment, the online concierge system 102 transmits 525 the request for the shopper to provide the indication of the availability of the item to a client device of the shopper along with the items included in the order, providing the shopper with an instruction or other cue to determine an availability within the warehouse 110 of the item having less than the threshold availability.

As the shopper fulfills the order, the online concierge system 102 receives 530 an indication of the availability within the warehouse 110 of the item having less than the threshold availability from the client device of the shopper. In various embodiments, the indication has a first value when the shopper locates the item within the warehouse 110 and has a second value when the shopper does not locate the item within the warehouse. In response to receiving 530 an indication from the shopper that the item having less than the threshold availability was available in the warehouse, the online concierge system 102 updates stored information about the item at the warehouse 110 to indicate that the item having less than the threshold availability is available at the warehouse 110. In some embodiments, the online concierge system 102 receives information from a client device of the shopper that the shopper selected an replacement item identified by the user in place of the item having less than the threshold availability when fulfilling the order, with the information that the shopper selected the replacement item mapped by the online concierge system 102 to an indication the item having less than the threshold available was not available at the warehouse 110 or to a value for the indication corresponding to the item having less than the threshold availability not being available at the warehouse 110. Alternatively, the indication is an image of a location within the warehouse 110 of the item, and the online concierge system 102 processes the image to determine whether the item is included in the image; the online concierge system 102 stores the first value in association with the item and the warehouse 110 in response to determining the image includes the item and stores the second value in association with item in response to determining the image does not include the item. In some embodiments, updating the stored information about the item at the warehouse 110 from the received indication from the shopper causes the online concierge system 102 to update the machine-learned item availability model 216 to account for the indication that the item having less than the threshold availability was available at the warehouse 110 when the shopper fulfilled the order. The online concierge system 102 may update the machine-learned item availability model 216 in response to receiving 530 the indication that the item having less than the threshold availability is available at the warehouse 110, allowing the online concierge system 102 to update the machine-learned item availability model 216 to more accurately predict availability of the item at the warehouse 110 for subsequent orders. In some embodiments, when updating the machine learned-item availability model 216 obtains updated inventory information from the warehouse 110 in response to receiving 530 the indication that the item having less than the threshold availability is available at the warehouse 110. For example, in response to receiving 530 indication that the item having less than the threshold availability is available at the warehouse 110, the online concierge system 102 transmits a request to the warehouse 110 for an updated inventory available at the warehouse 110. The online concierge system 102 uses the updated inventory received from the warehouse 110 to retrain the machine-learned item availability model 216, as further described above in conjunction with FIG. 4. Additionally, the online concierge system 102 may update the machine-learned item availability model 216 in response to the indication received from the shopper indicating that the item having less than the threshold availability is not available at the warehouse 110, allowing the online concierge system 102 to further refine the machine-learned item availability model 216 when the item having less than the threshold availability at the warehouse 110 is determined by the shopper not to be available at the warehouse 110.

FIG. 6 is a flowchart of one embodiment of a method for an online concierge system 102 requesting an indication of an item's availability from a shopper fulfilling one or more orders at a warehouse 110. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments.

An online concierge system 102 receives 605 a request to create an order from one or more users. The request identifies a warehouse 110 from which items included in the order are obtained. In various embodiments, in response to receiving 605 a request from a user, the online concierge system 102 transmits 610 an ordering interface to a client device of the user for display in a customer mobile application 106 executing on the client device. The ordering interface displays items offered by the warehouse 110 identified by the request and receives selections of items for inclusion in the order from the user.

When generating the ordering interface transmitted to the client device, the online concierge system 102 determines availabilities of items offered by the warehouse. As further described above in conjunction with FIGS. 2 and 4, the online concierge system 102 maintains a machine-learned item availability model 216 that is applied to a combination of the warehouse 110 identified by the request to create the order and an item offered by the warehouse 110 to output a probability of the item being available at the warehouse 110 (also referred to as an "availability" of the item). The online concierge system 102 accounts for availabilities of items when displaying items via the ordering interface. For example, the ordering interface visually distinguishes items having less than a threshold availability from items having greater than the threshold availability. As an example, the ordering interface displays text, a symbol, or an image in conjunction with information identifying an item having less than the threshold availability. In other examples, the ordering interface displays information identifying an item having less than the threshold availability using a different color or a different font than items having at least the threshold availability or displays information identifying the item having less than the threshold availability in a lower position in the ordering interface than items having greater than the threshold availability. In some embodiments, the ordering interface displays an estimated time when the item is expected to have at least the threshold availability at the warehouse 110. The estimated time may be determined by the machine-learned item availability model 216 in some embodiments, while in other embodiments, a different trained model determines the estimated time when the item is likely to have at least the threshold availability at the warehouse 110 from information obtained from the warehouse 110 and from one or more shoppers fulfilling orders at the warehouse 110.

In various embodiments, the online concierge system 102 includes a selectable option in the ordering interface proximate to an item having less than the threshold availability. The selectable option allows a user to request a notification from the online concierge system 102 when the online concierge system 102 determines the item has greater than the threshold availability at the warehouse 110 or determines the item has at least an additional availability at the warehouse 110. For example, the ordering interface displays a prompt with text of "Notify Me When Available" proximate to the selectable option and to the item having less than the threshold availability.

When a user selects the selectable option displayed proximate to an item having less than the threshold availability, the online concierge system 102 receives 615 a request from the user for a notification when the item having less than the threshold availability from a client device of the user. The request includes an identifier of the user and an identifier of the item having less than the threshold availability. The online concierge system 102 stores the request in association with the user, in association with the item having less than the threshold availability, and in association with a warehouse 110 identified by the user for an order. The online concierge system 102 stores a time when the request was received in various embodiments. This allows the online concierge system 102 to log a number of requests to be notified about availability received for various items.

The online concierge system 102 leverages the requests received 615 from users to be notified about availability of an item to identify when to determine an availability of the item at a warehouse 110. In various embodiments, the online concierge system 102 determines a number of requests to be notified about availability received for a combination of a warehouse 110 and an item during a specific time interval. In response to the determined number of requests to be notified about availability received for the combination of a warehouse 110 and the item during the specific time interval equaling or exceeding a threshold value, the online concierge system 102 selects 620 a shopper fulfilling one or more orders and transmits 625 a request for the selected shopper to provide an indication of the availability of the item to a client device of the shopper, providing the shopper with an instruction or other cue to determine an availability within the warehouse 110 of the item. In other embodiments, the online concierge system 102 selects 620 a shopper fulfilling one or more orders and transmits 625 the request for the selected shopper to provide the indication of the availability of the item to the client device of the shopper in response to determining that an amount of time between a current time and a time when the online concierge system 102 received an indication of availability within the warehouse 110 of the item equals or exceeds a threshold amount of time. Alternatively, the online concierge system 102 selects 620 a shopper fulfilling one or more orders and transmits 625 the request for the selected shopper to provide the indication of the availability of the item to the client device of the shopper in response to determining that an amount of time between a current time and a time when the online concierge system 102 received inventory information from the warehouse 110 equals or exceeds a threshold amount of time.

In various embodiments, the online concierge system 102 accounts for locations of shoppers when selecting 620 a shopper, allowing the online concierge system 102 to minimize additional distance traveled by the shopper to determine whether the item is available within the warehouse 110. For example, in response to the determined number of requests to be notified about availability received for the combination of the warehouse 110 and the item during the specific time interval equaling or exceeding a threshold value, the online concierge system 102 identifies shoppers who are currently fulfilling orders in the warehouse 110 based on information from client devices of the shoppers (e.g., orders previously selected by shoppers and information received from shoppers who previously selected orders indicating when a shopper obtained an item included in a previously selected order). The online concierge system 102 identifies orders selected for fulfillment in the warehouse 110 by each of the identified shoppers. In some embodiments, the online concierge system 102 accounts for characteristics of orders selected for fulfillment by shoppers when identifying shoppers; for example, the online concierge system 102 identifies shoppers who selected orders for fulfillment in the warehouse 110 that have less than a threshold number of items. The online concierge system 102 selects 620 a shopper who has selected an order that includes one or more items within a threshold distance within the warehouse 110 of the item. For example, the online concierge system 102 obtains a layout of the warehouse 110 that identifies locations within the warehouse of different departments and selects 620 a shopper who previously selected an order including one or more items in a department within a threshold distance (e.g., within a threshold number of aisles) within the warehouse 110 of the item. As another example, the online concierge system 102 selects 620 a shopper who previously selected an order including an additional item in a common department as the item. The online concierge system 102 may account for times when a shopper obtained items in a previously selected order when selecting 620 a shopper in various embodiments. For example, the online concierge system 102 selects 620 a shopper who selected an order for fulfillment in the warehouse 110 and who obtained an item included in the order within a threshold distance within the warehouse 110 of the item within a threshold amount of a current time. As another example, the online concierge system 102 selects 620 a shopper who selected an order for fulfillment in the warehouse 110 and who most recently obtained an item included in the order within a threshold distance within the warehouse 110 of the item. In other embodiments, the online concierge system 102 selects 620 a shopper based on locations of shoppers obtained from client devices of shoppers. For example, the online concierge system 102 selects 620 a shopper who selected an order for fulfillment at the warehouse 110, has not fulfilled the order, and is within a threshold distance of the warehouse 110 for fulfilling the order. The online concierge system 102 receives a location of a shopper from one or more position sensors (e.g., global positioning sensors) included in a client device of the shopper in various embodiments. Alternatively, the online concierge system 102 determines a location of a shopper within a warehouse from information about order fulfillment received from the shopper. For example, the online concierge system 102 determines the shopper is obtaining an additional item included in an order and determines a location within the warehouse 110 of the additional item being obtained by the shopper; the online concierge system 102 selects the shopper in response to determining the location within the warehouse 110 of the additional item being obtained by the shopper is within a threshold distance of a location within the warehouse 110 of the item.

As the selected shopper fulfills the order at the warehouse 110, the online concierge system 102 receives 630 an indication of the availability within the warehouse 110 of the item from the client device of the shopper. In various embodiments, the indication has a first value when the shopper locates the item within the warehouse 110 and has a second value when the shopper does not locate the item within the warehouse. Alternatively, the embodiment is an image of a location within the warehouse 110 of a location of the item, and the online concierge system 102 processes the image to determine whether the item is included in the image; the online concierge system 102 stores the first value in association with the item and the warehouse 110 in response to determining the image includes the item and stores the second value in association with item in response to determining the image does not include the item. In response to receiving 630 an indication from the shopper that the item having less than the threshold availability was available in the warehouse, the online concierge system 102 updates stored information about the item at the warehouse 110 to indicate that the item having less than the threshold availability is available at the warehouse 110. In some embodiments, updating the stored information about the item at the warehouse 110 from the received indication from the shopper causes the online concierge system 102 to update the machine-learned item availability model 216 to account for the indication that the item having less than the threshold availability was available at the warehouse 110 when the shopper fulfilled the order, as further described above in conjunction with FIGS. 4 and 5. Additionally, the online concierge system 102 may update the machine-learned item availability model 216 in response to the indication received from the shopper indicating that the item having less than the threshold availability is not available at the warehouse 110.

ADDITIONAL CONSIDERATIONS

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online concierge system, requests from one or more users to create one or more orders for fulfillment at one or more warehouses;
determining, by the online concierge system, availabilities of one or more items at a warehouse identified by a request to create an order, wherein determining the availabilities of the one or more items at the warehouse comprises applying a machine-learned availability model to predict the availabilities, wherein the machine-learned availability model is trained by:
initiating a set of weights of the machine-learned availability model,
receiving a training set that comprises inventory information and past outcomes of delivery orders,
comparing a first item's availability across multiple warehouses to determine whether the item is chronically unavailable,
updating the training set based on the first item's availability across the multiple warehouses, and
adjusting the weights of the machine-learned availability model based on the training set;
transmitting an ordering interface from the online concierge system to a client device of a user, the ordering interface identifying at least one item having less than a threshold availability at the warehouse;
receiving, at the online concierge system, a request from the user for a notification when the online concierge system determines that the at least one item has at least the threshold availability at the warehouse;
determining a number of requests to be notified about an availability of the at least one item at the warehouse received during a specific time interval equals or exceeds a threshold value;
in response to determining that the number of requests to be notified about the availability of the at least one item at the warehouse received during the specific time interval equals or exceeds the threshold value, selecting a shopper fulfilling at least one order at the warehouse based at least in part on location information of the shopper relative to the warehouse, the location information derived from a client device of the shopper;
transmitting a request for the selected shopper to provide an indication of the availability of the at least one item at the warehouse to a client device of the selected shopper;
receiving, at the online concierge system from the client device of the selected shopper, a location-based image captured at a location within the warehouse corresponding to the at least one item;
automatically processing the location-based image to detect the location within the warehouse; and
retraining the machine-learned availability model using the indication, wherein the retraining comprises incorporating updated availability information and the location-based image as additional training data such that subsequent availability predictions for the at least one item are based on both historical inventory information and location-specific image data, wherein retraining the machine-learned availability model comprises:
receiving the indication of the availability of the at least one item at the warehouse from the client device of the selected shopper; and
retraining the machine-learned item availability model in response to the indication indicating the at least one item is available at the warehouse.

2. The method of claim 1, wherein selecting the shopper fulfilling the at least one order at the warehouse comprises:
identifying shoppers currently fulfilling orders in the warehouse based on information from client devices of the shoppers;
identifying orders selected for fulfillment in the warehouse by each of the identified shoppers; and selecting a shopper who selected an order including one or more items within a threshold distance within the warehouse of the at least one item.

3. The method of claim 2, wherein identifying shoppers currently fulfilling orders in the warehouse based on information from client devices of the shoppers comprises:

identifying shoppers currently fulfilling orders in the warehouse that have less than a threshold number of items.

4. The method of claim 2, wherein selecting the shopper who selected the order including one or more items within the threshold distance within the warehouse of the at least one item comprises:

selecting a shopper who selected an order including an additional item in a common department in the warehouse as the at least one item.

5. The method of claim 2, wherein selecting the shopper who selected the order including one or more items within the threshold distance within the warehouse of the at least one item comprises:

selecting a shopper who selected an additional order for fulfillment in the warehouse and who obtained an item included in the additional order within a threshold distance within the warehouse of the at least one item within a threshold amount of a current time.

6. The method of claim 2, wherein selecting the shopper who selected the order including one or more items within the threshold distance within the warehouse of the at least one item comprises:

selecting a shopper who selected an additional order for fulfillment in the warehouse and who most recently obtained an additional item within a threshold distance within the warehouse of the at least one item.

7. The method of claim 2, wherein selecting the shopper fulfilling the at least one order at the warehouse comprises:

selecting a shopper who selected an additional order for fulfillment at the warehouse, who has not fulfilled the additional order, and who is within a threshold distance of the warehouse.

8. The method of claim 1, wherein the indication comprises an image of a location within the warehouse of the at least one item.

9. A method comprising:

receiving, at an online concierge system, a request from a user to create an order for fulfillment at a warehouse;

determining, by the online concierge system, availabilities of one or more items at the warehouse, wherein determining the availabilities of the one or more items at the warehouse comprises applying a machine-learned availability model to predict the availabilities, wherein the machine-learned availability model is trained by:

initiating a set of weights of the machine-learned availability model, receiving a training set that comprises inventory information and past outcomes of delivery orders, comparing a first item's availability across multiple warehouses to determine whether the item is chronically unavailable, updating the training set based on the first item's availability across the multiple warehouses, and adjusting the weights of the machine-learned availability model based on the training set;

transmitting an ordering interface from the online concierge system to a client device of a user, the ordering interface identifying one or more items having less than a threshold availability at the warehouse;

receiving, at the online concierge system, a selection of an item having less than the threshold availability at the warehouse via the ordering interface;

receiving, at the online concierge system, a request that a shopper provide the online concierge system with an indication of the availability of the selected item at the warehouse;

receiving, at the online concierge system, a selection of the order for fulfillment by a shopper, where the shopper is selected based at least in part on location information of the shopper relative to the warehouse, the location information derived from a client device of the shopper;

transmitting the request for the selected shopper to provide an indication of the availability of the item at the warehouse to a client device of the selected shopper;

receiving the indication of the availability of the selected item at the warehouse from the client device of the selected shopper; and receiving, at the online concierge system from the client device of the selected shopper, a location-based image captured at a location within the warehouse corresponding to the at least one item;

automatically processing the location-based image to detect the location within the warehouse; and retraining a machine-learned item availability model used to determine availabilities of one or more items at the warehouse in response to the indication indicating the selected item is available at the warehouse, wherein the retraining comprises incorporating updated availability information and the location-based image as additional training data such that subsequent availability predictions for the at least one item are based on both historical inventory information and location-specific image data.

10. The method of claim 9, wherein the indication comprises an image of a location within the warehouse of the selected item.

11. The method of claim 10, wherein retraining the machine-learned item availability model used to determine availabilities of one or more items at the warehouse in response to the indication indicating the selected item is available at the warehouse comprises:

retraining the machine-learned item availability model in response to the online system determining that the image includes the selected item at the location within the warehouse of the selected item.

12. The method of claim 9, further comprising:

storing, at the online concierge system, the indication the selected item is available at the warehouse in response to the indication indicating the selected item is available at the warehouse.

13. The method of claim 9, wherein retraining the machine-learned item availability model used to determine availabilities of one or more items at the warehouse in response to the indication indicating the selected item is available at the warehouse comprises:

obtaining updated inventory information from the warehouse in response to the indication indicating the selected item is available at the warehouse; and retraining the machine-learned item availability model by applying the machine-learned item availability model to the updated inventory information.

14. A computer program product comprising a non-transitory computer readable storage medium having instructions encoded thereon that, when executed by a processor, cause the processor to:

receive, at an online concierge system, requests from one or more users to create one or more orders for fulfillment at one or more warehouses;

determine, by the online concierge system, availabilities of one or more items at a warehouse identified by a request to create an order, wherein determining the availabilities of the one or more items at the warehouse comprises applying a machine-learned availability model to predict the availabilities, wherein the machine-learned availability model is trained by:

initiating a set of weights of the machine-learned availability model, receiving a training set that comprises inventory information and past outcomes of delivery orders, comparing a first item's availability across multiple warehouses to determine whether the item is chronically unavailable, updating the training set based on the first item's availability across the multiple warehouses, and adjusting the weights of the machine-learned availability model based on the training set;

transmit an ordering interface from the online concierge system to a client device of a user, the ordering interface identifying at least one item having less than a threshold availability at the warehouse;

receive, at the online concierge system, a request from the user for a notification when the online concierge system determines that the at least one item has at least the threshold availability at the warehouse;

determine a number of requests to be notified about an availability of the at least one item at the warehouse received during a specific time interval equals or exceeds a threshold value;

in response to determining that the number of requests to be notified about the availability of the at least one item at the warehouse received during the specific time interval equals or exceeds the threshold value, select a shopper fulfilling at least one order at the warehouse based at least in part on location information of the shopper relative to the warehouse, the location information derived from a client device of the shopper;

transmit a request for the selected shopper to provide an indication of the availability of the at least one item at the warehouse to a client device of the selected shopper;

receive, at the online concierge system from the client device of the selected shopper, a location-based image captured at a location within the warehouse corresponding to the at least one item;

automatically process the location-based image to detect the location within the warehouse; and retrain the machine-learned availability model using the indication, wherein the retraining comprises incorporating updated availability information and the location-based image as additional training data such that subsequent availability predictions for the at least one item are based on both historical inventory information and location-specific image data, wherein retraining the machine-learned availability model comprises:

receiving the indication of the availability of the at least one item at the warehouse from the client device of the selected shopper; and retraining the machine-learned item availability model in response to the indication indicating the at least one item is available at the warehouse.

15. The computer program product of claim 14, wherein selecting the shopper fulfilling the at least one order at the warehouse comprises:

identify shoppers currently fulfilling orders in the warehouse based on information from client devices of the shoppers;

identify orders selected for fulfillment in the warehouse by each of the identified shoppers; and select a shopper who selected an order including one or more items within a threshold distance within the warehouse of at least one item.

16. The computer program product of claim 15, wherein identifying shoppers currently fulfilling orders in the warehouse based on information from client devices of the shoppers comprises:

identifying shoppers currently fulfilling orders in the warehouse that have less than a threshold number of items.

17. The computer program product of claim 15, wherein select the shopper who selected the order including one or more items within the threshold distance within the warehouse of the item comprises:

select a shopper who selected an additional order for fulfillment in the warehouse and who obtained an item included in the additional order within a threshold distance within the warehouse of the item within a threshold amount of a current time.

18. The computer program product of claim 15, wherein select the shopper who selected the order including one or more items within the threshold distance within the warehouse of the at least one item comprises:

select a shopper who selected an additional order for fulfillment in the warehouse and who most recently obtained an additional item within a threshold distance within the warehouse of the item.

19. The computer program product of claim 15, wherein select the shopper fulfilling one or more orders at the warehouse comprises:

select a shopper who selected an additional order for fulfillment at the warehouse, who has not fulfilled the additional order, and who is within a threshold distance of the warehouse.

* * * * *